Inventor
Paul M. Charping
By James P. Burns
Attorney

Sept. 12, 1939.  P. M. CHARPING  2,172,903
ELECTRIC LIGHTING SYSTEM
Filed Sept. 24, 1937   3 Sheets-Sheet 3
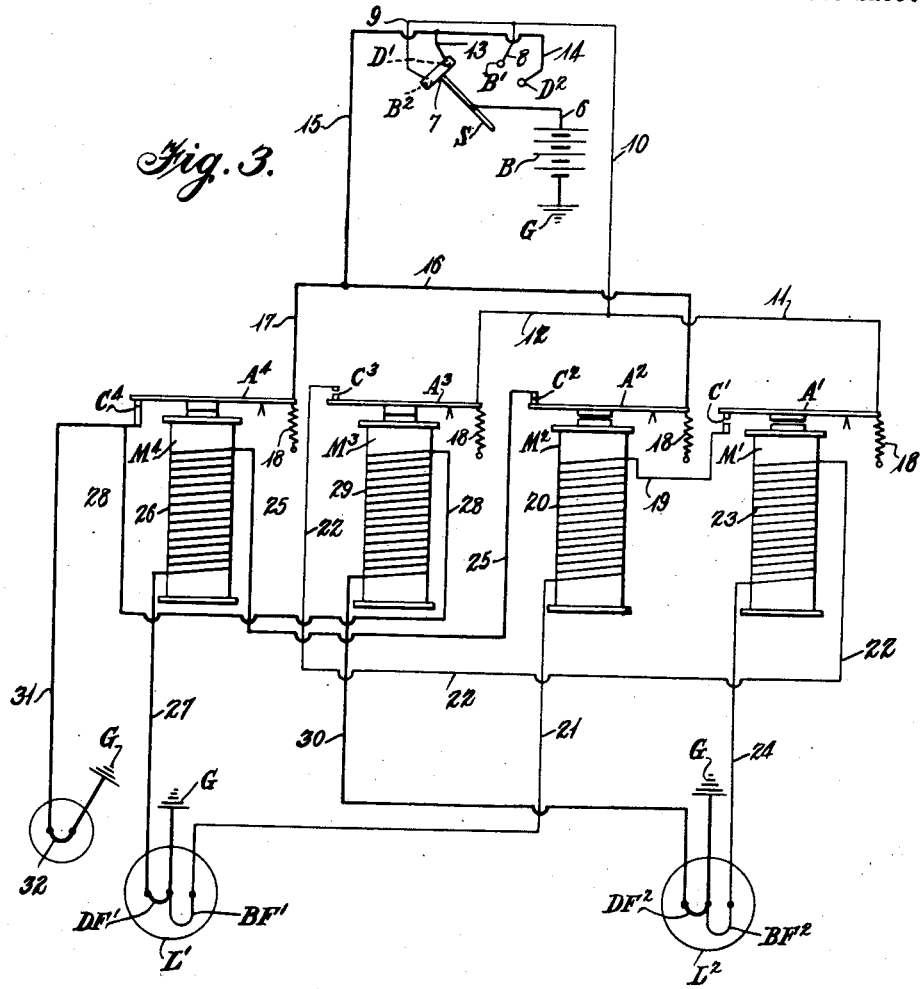
Inventor
Paul M. Charping
By James P. Burns
Attorney Patented Sept. 12, 1939

2,172,903

UNITED STATES PATENT OFFICE 2,172,903

ELECTRIC LIGHTING SYSTEM

Paul M. Charping, High Point, N. C.

Application September 24, 1937, Serial No. 165,597

3 Claims. (Cl. 171—97)

This invention relates to new and useful improvements in electric lighting systems and has particular reference to lighting systems for use in automotive vehicles as traffic or running lights.

The rules and regulations governing the operation of power propelled vehicles on the streets and the highways of the nation require each vehicle to be equipped with certain lights which must be kept illuminated during the hours of darkness while the vehicle is in operation. All vehicles are required to maintain at least one headlight and one rear light, while all vehicles suspended on four or more wheels are required to maintain at least two headlights and one tail light. Trucks, buses, and the like, in most sections of the country, are required to maintain certain additional running lights which function to indicate to pedestrians and drivers of other vehicles the type and size of the vehicle equipped with the said lights. The problem of keeping all of such lights in operation in compliance with traffic regulations oftentimes is dependent upon the alertness and mechanical ability of the vehicle operator and the availability of tools and spare bulbs.

The primary object of this invention is to provide a manually initiated, automatically controlled electric lighting system employing at least two filaments for each light and which will maintain all lights in operation as long as each light is provided with at least one good filament.

A further object of the invention is to provide an electric lighting system of the above mentioned type which is provided with means adapted to indicate any change in the operating condition of the system, due to actuation of the automatic control mechanism, after the system is manually set in operation.

A still further object of the invention is to provide a system of the above mentioned type which is of exceedingly simple construction, inexpensive to install and to maintain, and which requires but minor changes in the present day motor vehicle lighting system to convert the same into the system embodying this invention.

Other objects and advantages of the invention will be apparent during the course of the following description.

Figure 1:
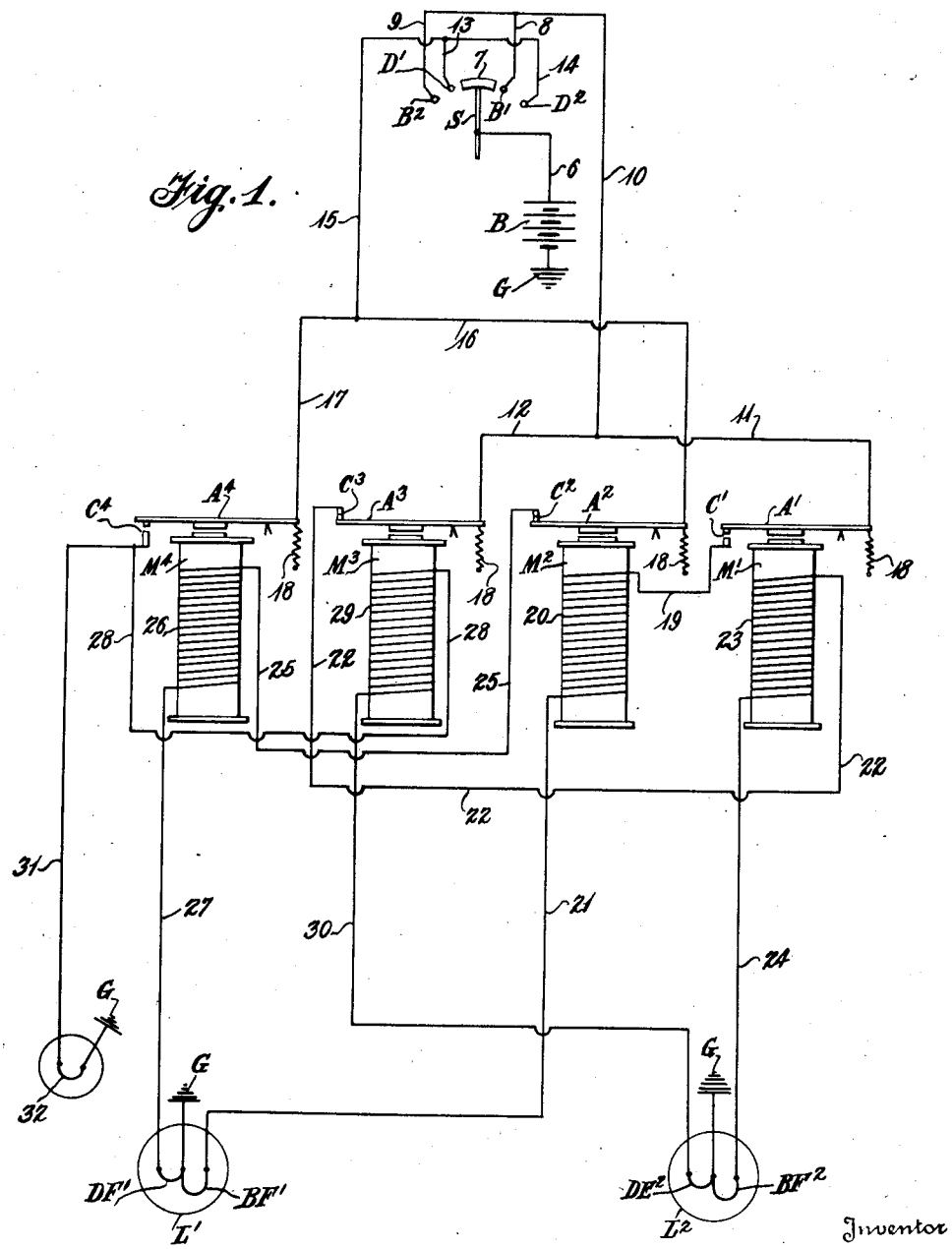
Figure 2:
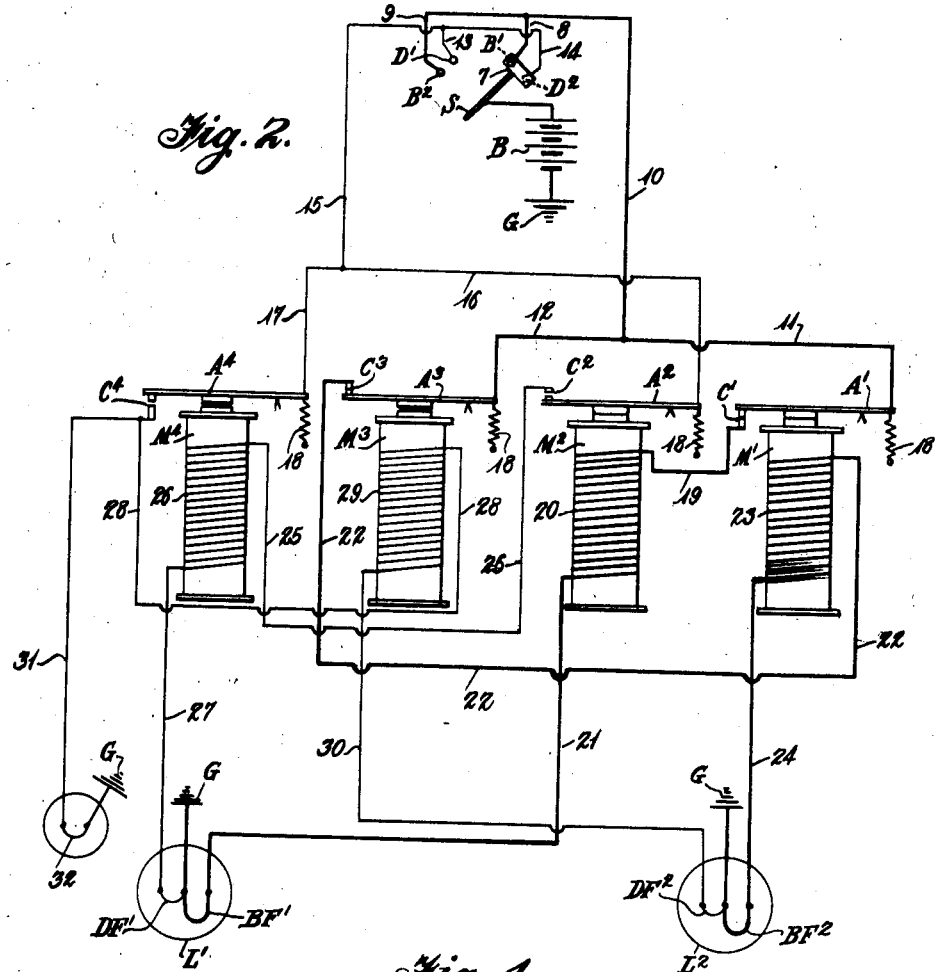
Figure 4:
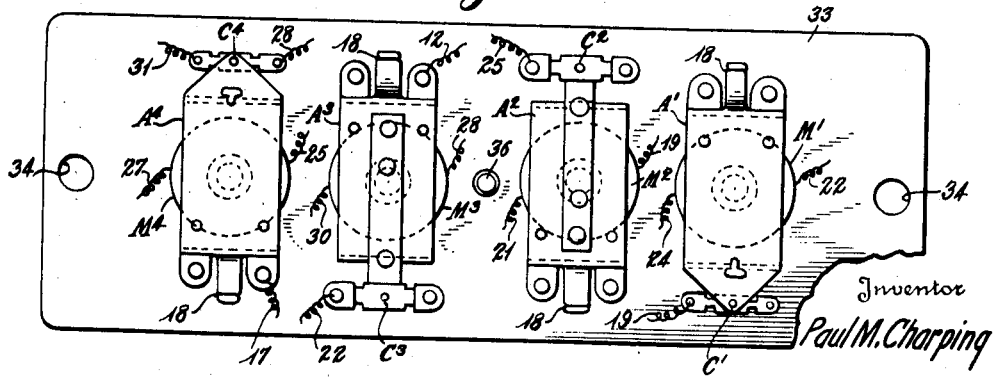

In the accompanying drawings which form a part of this specification, and in which like numerals are employed to designate like parts throughout the same, Figure 1 is a wiring diagram of the electric lighting system embodying this invention with the various parts arranged in their normal or inoperative position, Figure 2 is a wiring diagram of the system shown in Fig. 1 and with certain of the parts arranged in the positions assumed by the same when the system is operating to cause energy flow through one filament of each light, Figure 3 is a wiring diagram of the electric lighting system disclosed in Fig. 1 with certain operating parts of the same arranged in the positions they assume when the system is operating to cause energy flow through the second filament of each of the several lights, Figure 4 is a top plan view, with the cover removed, of a unit involving a plurality of relays which constitute the automatic switching means for the system, and Figure 5 is a transverse sectional view of the relay unit disclosed in Fig. 4, but with the cover applied.

For the sake of clearness of disclosure, I have selected to illustrate my invention, the two headlights of a motor vehicle with their bright and dim filaments. It is to be understood, however, that my electric lighting system is not limited in use to such automobile headlights, to lights having filaments of different candle power, or to a system involving only two lights. For this reason, it will be understood that my system is capable of use in connection with motor vehicle headlights and tail lights as well as the special running lights required on trucks, buses, vans, and the like.

Referring first to Fig. 1 of the drawings, wherein the system is illustrated diagrammatically in its normal or inoperative condition, the reference character B designates a battery, or other suitable source of electrical energy supply, which has one terminal grounded as at G. The remaining terminal of the battery is connected by a wire 6 to the movable blade S of a manually operable switch. This switch blade S is provided with an enlarged head or contact element 7 which, during movement of the switch blade S, is adapted to be moved into engagement with the contacts B' and D², when the switch blade is in one circuit closing position, and with the contacts D' and B², when the switch blade S is moved into its second circuit closing position.

The contacts B' and B² are connected by branch wires 8 and 9, respectively, to a common wire 10 which is connected to the branch wires 11 and 12. The wire 11 is suitably, electrically connected to the armature A' of the electromagnet M'. The wire 12 is suitably, electrically connected to the armature A³ of the electromagnet M³.

The contacts D' and D² are respectively connected by wires 13 and 14 to a common wire 15 which is connected to the branch wires 16 and 17. The branch wire 16 is suitably, electrically connected to the armature A² of the electromagnet M². The branch wire 17 is suitably, electrically connected to the armature A⁴ of the electromagnet M⁴. The several armatures A' to A⁴, inclusive, are pivotally mounted, as diagrammatically illustrated, and are biased by the springs 18 so that the armatures normally are out of contact with the pole piece of their respective electromagnet.

The several armatures are each provided with a pair of contacts so that movement of the armatures in opposite directions about their pivots will result in making and breaking circuits controlled by the contacts. The armature A' is provided with a pair of contacts C'. The armature A² is provided with a pair of contacts C². Armatures A³ and A⁴ are respectively provided with pairs of contacts C³ and C⁴.

The stationary element of the pair of contacts C' is connected by a wire 19 to the winding 20 of the electromagnet M². The second terminal of this winding 20 is connected by a wire 21 to one terminal of the bright filament BF' of the light L'. The stationary contact of the pair of contacts C³ is connected by a wire 22 to one terminal of the winding 23 for the electromagnet M'. The second terminal of this winding 23 is connected by a wire 24 with one terminal of the bright filament BF² of the light L².

The stationary contact for the pair of contacts C² is connected by a wire 25 with one terminal of the winding 26 for the electromagnet M⁴. The second terminal of this winding 26 is connected by a wire 27 to one terminal of the dim filament DF' for the light L'. The stationary element of the pair of contacts C⁴ is connected by a wire 28 to one terminal of the winding 29 for the electromagnet M³. The second terminal of this winding 29 is connected by a wire 30 to one terminal of the dim filament DF² of the light L². The stationary contact of the pair of contacts C⁴ also is connected by a wire 31 to one terminal of the filament 32 which acts as a signal or indicator light for disclosing to the operator of the vehicle the condition of the lighting system.

The second terminal of each one of the several filaments for the three lights is connected to a ground G for completing the circuit through these filaments back to the battery B.

In Figs. 4 and 5, there is disclosed the automatic switching unit which involves the several electromagnets M' to M⁴, the armatures A' to A⁴, and the several pairs of contacts C' to C⁴. These various elements are mounted on a common base 33 which is provided with end apertures 34 by means of which the base may be secured to a suitable portion of the motor vehicle which is equipped with this electric lighting system. Fig. 5 specifically illustrates a cover 35 which is secured to the base 33 by means of a post 36 to the outer end of which is threaded a nut 37. The same reference characters which have been applied to the different elements in Fig. 1 will be applied to the same elements in Figs. 4 and 5 so that the description of these elements need not be repeated.

The mode of operation of this electric lighting system now will be described:

To acquaint one with the possibilities of this system, a brief statement first will be given which will set forth the results accomplished. By throwing the manual switch blade in one direction, to the right in Figs. 1, 2 and 3, the bright filaments in both lights will be energized. By throwing the switch blade S to the left, both dim filaments of the said lights and the indicator filament 32 will be energized.

If the manual switch blade is moved to energize both bright filaments and one of said bright filaments burns out or its circuit is interrupted in any other manner, the proper automatic switching relays will operate to transfer the flow of energy from the bright circuits to both dim filament circuits. Should the dim filaments of the lights first be energized, by movement of the switch blade S to the left, the proper relays of the automatic switching unit will operate to switch the flow of electric energy from the dim filament circuits to the bright filament circuits, should a circuit for one of the dim filaments be interrupted, as by burning out of one of the dim filaments.

If we now assume that the manual switch blade has been moved into a position to first energize the bright filaments in all of the lights and that the circuit for one of the bright filaments has been interrupted to cause switching of the flow of energy to both dim filaments from the bright filaments, we will find that, should the dim filament circuit for the light having its bright filament circuit remaining in operative condition be interrupted, the automatic switching mechanism will operate to cause energy to flow through the uninterrupted dim filament circuit for one light and the uninterrupted bright filament circuit for the second light. It will be appreciated, therefore, that the system will operate to keep all lights energized as long as each light is provided with at least one good filament circuit.

As has been stated above, Fig. 1 discloses the system in its normal or inoperative condition. With all of the armatures normally spring biased upwardly at their contact ends, the pairs of contacts C² and C³ normally will be in engagement with each other so that the circuits which include these pairs of contacts normally will be closed with the exception of the breaks in these circuits which are controlled by the manual switch. The pairs of contacts C' and C⁴ are normally out of electrical engagement and the circuits containing the same will be broken both at their pairs of contacts and at the manual switch.

Fig. 2 discloses the condition of the system when the manual switch blade S has been moved to the right to energize the bright filaments for the two lights. For the sake of clearness, the wires which form the circuits for the bright filaments are presented in heavier lines than the lines employed for showing the circuits to the dim filaments.

When the switch blade S is moved to the right manually, its head or contact 7 first engages fixed contact B' for causing current to flow from the battery B through the wires of the bright filament circuits. Further movement of the switch blade S to the right causes the head or contact 7 of the blade to engage the stationary contact D² which will connect the circuits for the dim filaments with the battery B. It will be explained, however, that due to first causing energy flow through the circuits for the bright filaments, the automatic switching relays will function to prevent energization of the dim filaments for the lights.

Further referring to Fig. 2, in tracing out the heavy lines which indicate the wires, we find that energy flows from the battery B through the switch blade S and contact 7 to the contact B'. The current then flows through the wire 8 to the wire 10. From the wire 10, the current flows through the wire 12 to the armature $A^3$ which is spring biased into a position to cause engagement of its contacts $C^3$. The current then flows through the wire 22 to the winding 23 of the electromagnet M' and from this winding 23 through the wire 24 to the bright filament $BF^2$ of the lamp $L^2$. The circuit is completed through the ground G for this filament. Current flow through the winding 23 of the electromagnet M' causes the armature A' to be attracted for moving its contacts C' into engagement. This engagement of the contacts C' causes current to flow from the wire 10 through the wire 11 to the armature A', through the contacts C' to the wire 19 and through the wire 19 to the winding 20 of the electromagnet $M^2$. The current flows from the winding 20 through the wire 21 to the bright filament BF' of the light L'. The circuit for the bright filament of the light L' is completed through the ground G for this light.

It will be seen that energization of the electromagnet $M^2$ will cause attraction of the armature $A^2$ with the result that the contacts $C^2$ are separated. Separation of these contacts breaks the circuit for the dim filament of one of the lights. It is necessary that the circuit for this dim filament be energized before the circuit for the dim filament of the second light is energized.

Let us now consider the system in the condition illustrated in Fig. 3. In this condition, the switch blade S has been moved to the left for causing energy flow through the dim filaments of both of the lights. As was described in connection with energization of the bright filaments, the head 7 of the switch blade first engages contact D' and then engages contact $B^2$ for successively connecting the battery B with the wires 15 and 16 which lead to the dim and bright filament circuits respectively.

When the head 7 of the switch blade S engages contact D', current flows from the battery to and through the wire 15. Current then flows through the wire 16 to the armature $A^2$. As the electromagnet $M^2$ is not energized, the armature $A^2$ is spring biased into the position where the contacts $C^2$ are in engagement. Current then flows through the wire 25 to the winding 26 of the electromagnet $M^4$ and from this winding 26 through the wire 27 to the dim filament DF' of the light L'.

Energization of the magnet $M^4$ causes the armature $A^4$ to be attracted for closing the contacts $C^4$. Current then flows from the wire 15 through the wire 17 to the armature $A^4$ and through the contacts $C^4$ to the wire 28. This wire conducts the current to the winding 29 of the electromagnet $M^3$ and from this winding, the current flows through the wire 30 to the filament $DF^2$ of light $L^2$.

Energization of the magnet $M^3$ attracts the armature $A^3$ for moving the same to break the circuit between the contacts $C^3$. This energization of the magnet $M^3$, therefore, breaks the circuit to the bright filament $BF^2$ of light $L^2$.

Breaking the circuit for the bright filament $BF^2$ of light $L^2$ de-energizes the electromagnet M' for breaking the circuit at the contacts C' for the bright filament BF' of light L'. It will be seen, therefore, that the circuits for the two dim filaments are closed while the circuits for the two bright filaments are opened.

Closing of the contacts $C^4$ by energization of the electromagnet $M^4$ also causes energy flow through the wire 31 to the filament 32 of the signal or indicator light. It will be appreciated, therefore, that whenever the contacts $C^4$ are closed, the circuits for the dim filament $DF^2$ and the filament 32 for the signal or indicator light will be energized.

The circuits for both bright filaments and both dim filaments now have been traced. Let us return to the disclosure of Fig. 2 where the bright filaments for both the lights are energized. We will now consider that the bright filament BF' either burns out or the circuit for the same is interrupted due to some other cause. Breaking of the circuit for the filament BF' stops the flow of electricity through the winding 20 for the electromagnet $M^2$. The armature $A^2$, therefore, is no longer attracted and its spring 18 will pull the same away from the pole piece of the magnet to cause the contacts $C^2$ to be closed.

Current will then flow from the wire 15, connected to the battery B through the contact $D^2$ for the manual switch. This current will flow from the wire 15 to the wire 16 to the armature $A^2$ and from this armature through the contacts $C^2$ and the wire 25 to the winding 26 of the electromagnet $M^4$. The circuit is completed through the wire 27 from the winding 26 to the dim filament DF' of the light L'. Current flowing through the winding 26 of the electromagnet $M^4$ energizes this magnet and attracts the armature $A^4$ with the result that contacts $C^4$ are placed in engagement with each other. Closing of the contacts $C^4$ causes current to flow from the wire 15 through the wire 17 to the armature $A^4$ and from this armature through the contacts $C^4$ to the wire 28. This wire is connected to the winding 29 of the electromagnet $M^3$. The remaining terminal of the winding 29 is connected by the wire 30 to the dim filament $DF^2$ of the light $L^2$. Both of the dim filaments, now, are energized. Closing of the circuit through the winding 29 of the electromagnet $M^3$ causes the armature $A^3$ to be attracted for breaking the circuit at the contacts $C^3$. Separation of these contacts $C^3$ breaks the circuit through the bright filament $BF^2$ of the light $L^2$. Breaking of the circuit to the filament $BF^2$ causes de-energization of the electromagnet M' with the result that the spring 18 for the armature A' moves this armature to break the circuit formed by the contacts C'. Separation of these contacts breaks the circuit for the winding 20 of electromagnet $M^2$ and the bright filament BF' independently of the interruption which occurred in the circuit for this bright filament BF' and which interruption started the automatic switching mechanism to function to switch the energy flow from the bright filaments to the dim filaments. It now will be seen that interruption of the circuit for the bright filament BF' automatically causes the change of energy flow over to the condition illustrated in Fig. 3 with the single exception that the switch arm S is still in its right-hand position, as illustrated in Fig. 2.

With the current flowing as indicated by the heavy lines in Fig. 3, and remembering that the circuit for the bright filament BF' is permanently inoperative, let us now consider that dim filament $DF^2$ burns out or the circuit for the same is interrupted due to some other cause. With this condition existing, we will still have a good dim filament in light L' and a good bright filament in light L².

Interruption in the circuit for dim filament DF² causes de-energizaion of the electromagnet M³ with the result that the spring 18 for armature A³ will move the armature to close contacts C³. Current will then flow from the switch blade S through the contact B' and the wires 8 and 10 to the wire 12 and from this wire to the armature A³. With contacts C³ closed, the current will flow through the wire 22 to the winding 23 of the electromagnet M' and from this winding to the wire 24 of the bright filament BF² of the light L². Closing of the circuit for the bright filament BF² energizes the electromagnet M' with the result that the armature A' is attracted and contacts C' are placed in engagement. It will be remembered, however, that the circuit for the bright filament BF' has been interrupted. The result that closing of the contacts C' fails to cause current to flow through the winding 20 of the magnet M². The failure to energize the electromagnet M² will permit the armature A² to remain in its spring biased position with contacts C² in engagement with each other. Current flow will, therefore, continue through the contacts C² to the wire 25, through the winding 26, and the wire 27, and through the dim filament DF' of light L'. We now have current flowing through the bright filament BF² and the dim filament DF'. Any further interruptions in the filament circuits will cause one of the lights to remain without a good filament circuit so that no further changes can take place.

Let us now consider that the switch blade S has been moved into its left-hand position, as illustrated in Fig. 3. The circuits for the two dim filaments DF' and DF² are then energized.

Let us also consider that the circuit for dim filament DF² is interrupted either by burning out of the filament or by some other mechanical failure. Current will then cease to flow through the winding 29 of the electromagnet M³. The armature A³ will no longer be attracted and its spring 18 will move the armature to close the contact C³. Current will then flow through the wire 12, the armature A³, the contacts C³ and the wire 22 to the winding 23 of the electromagnet M'. From this winding, the current will flow through the wire 24 to the bright filament BF² of the light L². Energization of magnet M' will cause armature A' to be attracted for closing contacts C'. Current will then flow through wire 11 to the armature A' and through the contacts C' and the wire 19 to winding 20 of the electromagnet M². The current will further flow through wire 21 to the bright filament BF' of light L'.

Energization of electromagnet M² will cause the armature A² to be attracted for breaking the circuit at contacts C² with the result that the winding for electromagnet M⁴ will no longer have current flowing through the same. This results in de-energization of this electromagnet and permits the spring 18 for the armature A⁴ to move this armature to break the circuit at the contacts C⁴. Separation of these contacts breaks the circuit to the winding 29 for electromagnet M³ and for the dim filament DF² of light L². It will be remembered, however, that the circuit for the dim filament DF² was previously interrupted.

As both of the bright filaments are now energized, the circuit conditions are the same as those illustrated in Fig. 2 with the exception that the switch blade S is in its left-hand circuit closing position, as illustrated in Fig. 3. Let us now assume that bright filament BF', or its circuit, is rendered inoperative either due to burning out of the bright filament BF' or from some other cause. We now have a good dim filament and circuit for light L' and a good bright filament and circuit for light L².

Interruption in the circuit for bright filament BF' causes electromagnet M² to be de-energized with the result that contacts C² will be closed. Current will then flow through the wires 15 and 16, the armature A², contacts C², the wire 25, the winding 26 and the wire 27 to the good dim filament DF' of light L'. It will be remembered that the circuit for the dim filament DF² was interrupted. The winding 29 for the electromagnet M³, therefore, is not active and the armature A³ is in its spring biased position with contacts C³ in engagement with each other. Current then flows through the wire 10 to the wire 12 and through the armature A³ to the wire 22. From this wire 22, current flows through the winding 23 and the wire 24 to the good bright filament BF² of light L². We now have dim filament DF' and bright filament BF² energized. No further automatic changing can take place in the separate filament circuits because each of the two lights L' and L² has only one good filament and filament circuit.

It is to be understood that the form of this invention herewith shown and described is to be taken as a preferred example of the same, and that various changes in the shape, size, and arrangement of parts may be resorted to without departing from the spirit of the invention or the scope of the sub-joined claims.

Having thus described the invention, I claim:

1. An electric lighting system for automotive vehicles, or the like, comprising in combination a source of electric energy, a plurality of lights each of which includes two filaments, a separate circuit between the source of energy and each light filament, each of said separate circuits having interposed therein the winding of one relay and a pair of contacts controlled by the opposing forces of a spring and the armature of a relay having its winding in one of the other circuits, said separate circuits being operatively grouped in sets with one filament circuit of each light in each set, a manual switch blade movable from neutral position into two different circuit closing positions in each of which latter positions the source of energy is connected to all of the separate circuits, each of said sets of circuits normally having one pair of contacts held closed by their spring and one pair held open by their spring when the manual switch blade is in its neutral position, the movement of said switch blade into either circuit closing position causing energy to flow through the circuit of one set which has a spring closed pair of contacts and as a result of energization of the winding of the relay in that circuit effecting closing of the pair of contacts in said set of circuits which were held open by their spring so that the filaments of all lights for said set of circuits will be energized, the energizing of the relay for the pair of contacts originally held open by their spring resulting in energizing the winding of the relay which controls the pair of contacts in the other set of circuits normally held closed by their spring so that there will be no energy flow in any circuit of said last mentioned set.

2. An electric lighting system of the character defined in claim 1 further characterized by the fact that the interruption of one of the circuits for the energized set automatically causes de-energizing of the said energized relay windings of that set and energizing of the relay windings of the other set for respectively opening the pairs of contacts for the circuits of the first energized set and closing the pairs of contacts for the circuits of the set which was rendered inoperative by the initial setting of the manual switch blade so that energy will flow through the second filament of each light.

3. An electric lighting system of the character defined in claim 1 further characterized by the fact that the interruption of one of the circuits for the energized set automatically causes de-energization of the said energized relay windings of that set and energizing of the relay windings of the other set for respectively opening the pairs of contacts for the circuits of the first energized set and closing the pairs of contacts for the circuits of the set which were rendered inoperative by the initial setting of the manual switch blade so that energy will flow through the second filament of each light, and the interruption of one of the circuits for the set automatically rendered operative causing closing of the pair of contacts in the uninterrupted circuit of the first energized set, by de-energizing the winding for the relay in said last interrupted circuit which had been holding said contacts open against the action of their spring, so that there will be energy flow through the remaining uninterrupted circuit of each set and each light will have an energized filament.

PAUL M. CHARPING.